(12) United States Patent
Meier et al.

(10) Patent No.: US 6,285,490 B1
(45) Date of Patent: Sep. 4, 2001

(54) HIGH YIELD SPRING-RING MICROMIRROR

(75) Inventors: Robert E. Meier, Dallas; James D. Huffman, Richardson; Richard L. Knipe, McKinney, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/475,730

(22) Filed: Dec. 30, 1999

Related U.S. Application Data
(60) Provisional application No. 60/114,249, filed on Dec. 30, 1998.

(51) Int. Cl.[7] .................................................. G02B 26/00
(52) U.S. Cl. ......................... 359/291; 359/224; 359/290; 359/298; 345/108; 347/239
(58) Field of Search .................................... 359/291, 224, 359/290, 298; 345/108; 347/239

(56) References Cited

U.S. PATENT DOCUMENTS

| | | | |
|---|---|---|---|
| 5,061,049 | 10/1991 | Hornbeck | 359/224 |
| 5,583,688 | 12/1996 | Hornbeck | 359/291 |
| 5,867,202 | 2/1999 | Knipe et al. | 347/239 |
| 6,147,790 * | 11/2000 | Meier et al. | 359/291 |

\* cited by examiner

*Primary Examiner*—Georgia Epps
*Assistant Examiner*—John J. Magee
(74) *Attorney, Agent, or Firm*—Charles A. Brill; Wade James Brady, III; Frederick J. Telecky, Jr.

(57) ABSTRACT

An improved micromechanical device comprising a substrate (104), a deflectable member (102) suspended over the substrate (104), at least one spring-ring (124) supported above the substrate (104); and at least one address electrode (110) spaced apart from substrate (104). The spring-ring (124) resists deflection of the deflectable member (102) when the deflectable member (102) deflects to contact the spring-ring (124). By moving the address electrode (110) off the substrate level, the micromirror is much more immune to particle-caused short circuits, and a planer surface on which to fabricate the mirror (102) is provided without the need to utilize an inverse spacer layer.

7 Claims, 3 Drawing Sheets

HIGH YIELD SPRING-RING MICROMIRROR

CROSS-REFERENCE TO RELATED APPLICATIONS

This application claims priority under 35 USC §119(e)(1) of provisional application No. 60/114,249 filed Dec. 30, 1998.

The following patents and/or commonly assigned patent applications are hereby incorporated herein by reference:

| U.S. Pat. No. | Filing Date | Issue Date | Title |
| --- | --- | --- | --- |
| 5,061,049 | Sept. 13, 1990 | Oct. 29, 1991 | Spatial Light Modulator and Method |
| 5,583,688 | Dec. 21, 1993 | Dec. 10, 1996 | Multi-Level Digital Micromirror Device |
| 5,867,202 | Dec. 13, 1996 | Feb. 2, 1999 | Micromechanical Devices with Spring Tips |
| 09/311,009 now U.S. Pat. 6,147,790 issued 11-14-2000 | May 13, 1999 | | Spring-Ring Micromechanical Device |

FIELD OF THE INVENTION

This invention relates to the field of micromechanical devices, more particularly to micromechanical devices having a deflectable member, more particularly to digital micromirror devices.

BACKGROUND OF THE INVENTION

Micromechanical devices are small structures typically fabricated on a semiconductor wafer using techniques such as optical lithography, doping, metal sputtering, oxide deposition, and plasma etching which have been developed for the fabrication of integrated circuits.

Digital micromirror devices (DMDs), sometimes referred to as deformable micromirror devices, are a type of micromechanical device. Other types of micromechanical devices include accelerometers, pressure and flow sensors, gears and motors. While some micromechanical devices, such as pressure sensors, flow sensors, and DMDs have found commercial success, other types have not yet been commercially viable.

Digital micromirror devices are primarily used in optical display systems. In display systems, the DMD is a light modulator that uses digital image data to modulate a beam of light by selectively reflecting portions of the beam of light to a display screen. While analog modes of operation are possible, DMDs typically operate in a digital bistable mode of operation and as such are the core of the first true digital full-color image projection systems.

Micromirrors have evolved rapidly over the past ten to fifteen years. Early devices used a deformable reflective membrane which, when electrostatically attracted to an underlying address electrode, dimpled toward the address electrode. Schlieren optics illuminate the membrane and create an image from the light scattered by the dimpled portions of the membrane. Schlieren systems enabled the membrane devices to form images, but the images formed were very dim and had low contrast ratios, making them unsuitable for most image display applications.

Later micromirror devices used flaps or diving board-shaped cantilever beams of silicon or aluminum, coupled with dark-field optics to create images having improved contrast ratios. Flap and cantilever beam devices typically used a single metal layer to form the top reflective layer of the device. This single metal layer tended to deform over a large region, however, which scattered light impinging on the deformed portion. Torsion beam devices use a thin metal layer to form a torsion beam, which is referred to as a hinge, and a thicker metal layer to form a rigid member, or beam, typically having a mirror-like surface: concentrating the deformation on a relatively small portion of the DMD surface. The rigid mirror remains flat while the hinges deform, minimizing the amount of light scattered by the device and improving the contrast ratio of the device.

Recent micromirror configurations, called hidden-hinge designs, further improve the image contrast ratio by fabricating a mirror over the torsion beams. The elevated mirror blocks incident light from striking the torsion beams, torsion beam supports, and a rigid yoke connecting the torsion beams and mirror support. These support structures, along with the address electrodes and mirror bias/reset metalization on the device substrate, all tend to scatter light striking them. This scattered light reaches the image screen and reduces the contrast ratio of the projected image. The hidden-hinge micromirror design improves the contrast ratio of the images by preventing most light from reaching these support structures.

Elevating the micromirror above the torsion beams and their supports requires a support structure to space the micromirror above the torsion beams. Typically, a spacervia or support post is fabricated to perform this task. A spacervia is a hollow tube of metal formed by depositing metal into a hole in the sacrificial layer on which the mirror is fabricated. The hollow spacervia has an open top which decreases the surface area of the micromirror. Additionally, the open top of the spacervia is a sharp edge which diffracts incident light—lowering the contrast ratio of the projected image.

In addition to the need to improve the contrast ratio of the projected images, micromirror designers also strive to improve the reliability of the mirror reset—the act of returning the micromirror to a neutral position after it has been rotated to either the on or off position. Some micromirrors tend to stick to the landing sites due to a variety of forces such as the van der Waals force generated by water vapor present on the device surface and intermetallic bonding. A technique called resonant reset uses voltage pulses to resonate the micromirror and torsion beams causing the mirror to spring away from the landing site and back to a neutral position.

Unfortunately, the magnitude of the force sticking the mirrors to the landing sites varies over a wide range. Mirrors that are stuck to the landing sites only weakly often release from the landing site after a single reset pulse, while other mirrors may require several pulses before storing sufficient energy to release from the landing site. Prematurely released mirrors cause several problems. First, a prematurely released micromirror may land during the remainder of the resonant reset period. If the prematurely released micromirror lands late enough in the resonant reset period, the mirror will not be able to store enough energy from the reset pulses to release from the landing site a second time. Second, the prematurely released micromirror may tend to flutter about the axis of the torsion beams. If the mirror bias voltage is reapplied while the fluttering mirror is rotated toward the wrong address electrode, the mirror will be electrostatically latched to the wrong address electrode—causing an intermittent twinkling of dark pixels.

The advent of the spring-ring micromirror brought about a solution to many reset problems and provided a device that operated and reset consistently over a very wide range of bias voltages. The spring-ring architecture, however, was still vulnerable to particle induced short circuits. Furthermore, the spring-ring architecture required additional process steps to form a photoresist inverse yoke to ensure mirror planarity. Additionally, the spring-ring design proved difficult to reduce in size without affecting the operating parameters.

Therefore, there is a need for an improved micromirror design that provides the robust operating ranges of the spring-ring architecture but with improved producibility, immunity to particulate-induced failures. Ideally the new micromirror design can be fabricated over a range of micromirror cell sizes, without significant redesign, to allow the new micromirror design to be used on many platforms.

SUMMARY OF THE INVENTION

Objects and advantages will be obvious, and will in part appear hereinafter and will be accomplished by the present invention which provides a method and system for an improved micromechanical having a spring-based return structure and method of fabrication. One embodiment of the claimed invention provides an improved micromechanical device comprising: a substrate, a spring-ring suspended over said substrate, at least one address electrode supported over the substrate, and a deflectable member supported over the spring-ring and the address electrode by a torsion beam hinge. The deflectable member is operable to rotate about the torsion beam hinge in response to a voltage differential between the deflectable member and the address electrode, the spring-ring operable to resist deflection of the deflectable member when deflection of the deflectable member creates contact between said deflectable member and the spring-ring.

A second embodiment of the disclosed invention provides a method of fabricating an improved micromechanical device. The method comprising the steps of: fabricating at least two support structure on a substrate, fabricating at least one spring-ring spaced apart from the substrate and supported by at least one of the support structures, and fabricating at least one address electrode spaced apart from the substrate and supported by at least one of the support structures, and fabricating a deflectable member spaced apart from the substrate.

Yet another embodiment of the disclosed invention provides a display system comprising: a light source capable of providing a light beam along a light path, a micromirror device on the light path, a controller electrically connected to the micromirror device, the controller providing electrical signals to the micromirror device to cause the micromirror device to selectively deflect the deflectable members thereby selectively reflecting light striking the deflectable members along a projection light path, and projection optics located in the projection light path, the projection optics operable to focus light reflected by the micromirror device onto an image plane. The micromirror device comprised an array of micromirror elements, each micromirror element comprised of: a substrate, a spring-ring supported by and spaced apart from the substrate, an address electrode supported by and spaced apart from the substrate; and a deflectable member supported by the substrate and spaced apart from the spring, said deflectable member comprising a mirror in the light path and operable to deflect toward the spring, the spring operable to resist deflection of the deflectable member upon contact between the spring and the deflectable member.

The improved spring-ring architecture disclosed herein provides several advantages. First, all of the electrostatically active surfaces are supported above the metal 3 layer. Moving the electrostatically active surfaces away from metal 3 reduces the likelihood of short-circuits. Moving the electrostatically active components away from the metal 3 layer also frees up a large area of the metal 3 layer. Dummy metal areas added to the metal 3 layer provide a planar surface on which to deposit the first spacer layer, and prevent shorting between the various components on metal 3.

Another advantage of the disclosed architecture is the elimination of the need for an inverse-yoke structure. The inverse yoke of the prior spring-ring designs filled in the gap between the spring-ring and the active hinge yoke. The active hinge yoke has been eliminated and a raised address electrode has replaced it. The raised address electrode substantially fills the entire yoke and spring-ring layer. Since there are no longer large gaps on the intermediate level containing the spring-ring and the torsion hinges, an inverse yoke is unnecessary.

Furthermore, the new spring-ring architecture is easily scaled to other cell sizes with a minimal impact to the operational robustness of the cell. To shrink the cell, the dimensions are scaled and then the scaled cell is adjusted to meet the minimum design rules. Generally the gaps between the spring-ring and the address electrodes must be enlarged from their scaled-down dimensions to meet the design rules. Because the area of the address electrode on intermediate layer is maximized, the scaled micromirror cell retains as much of the operational robustness as possible.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new micromirror device has been developed that simultaneously improves both the producibility of the micromirror device and the devices immunity to particle-induced short-circuits. The improved micromirror device is a spring-ring type micromirror device with a large raised address electrode that eliminates the need for an active torsion hinge yoke and improves the device's resistance to short-circuits.

Figure 1:
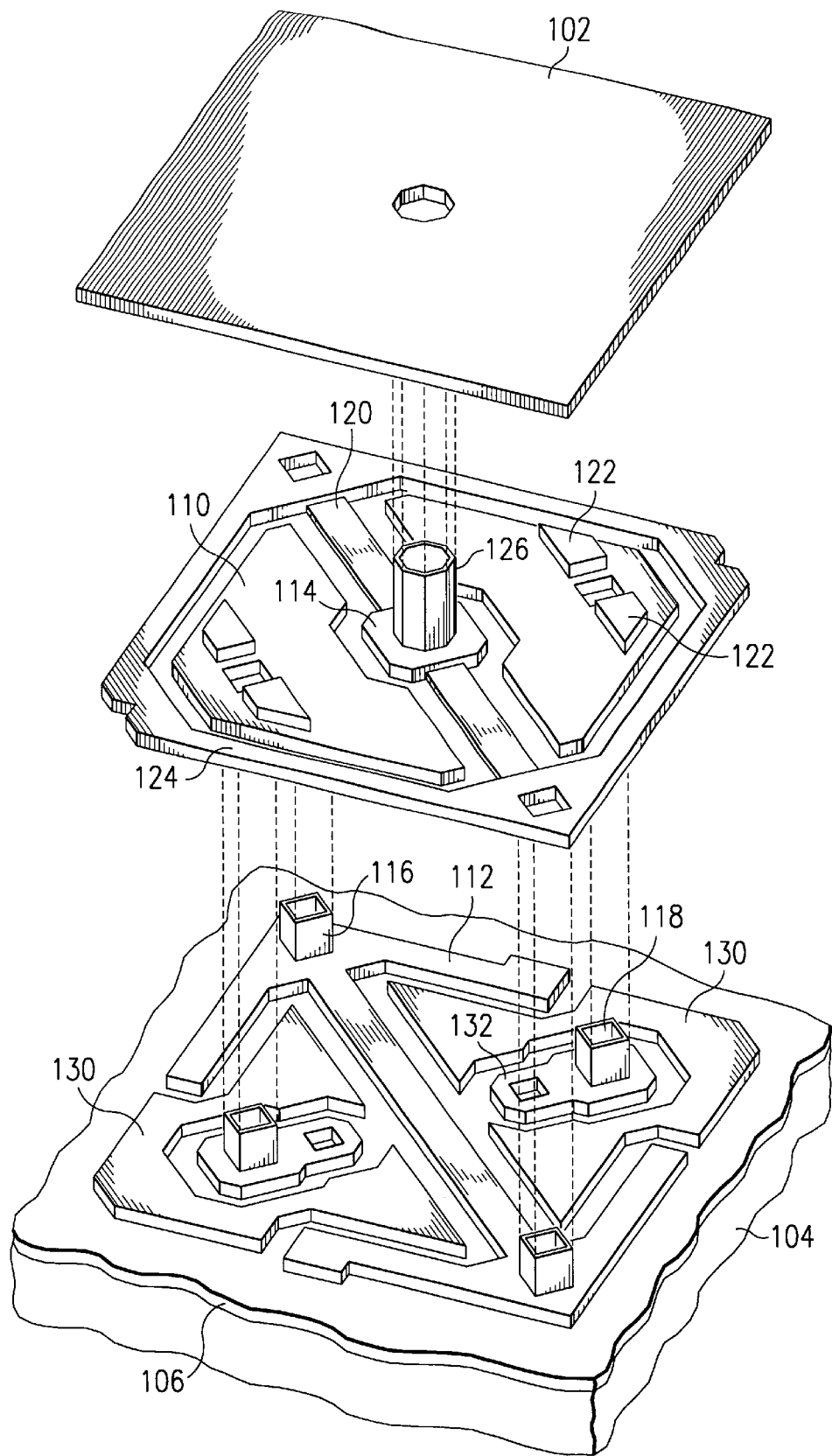
FIG. 1 is an exploded perspective view of a single micromirror element according to one embodiment of the present invention.

A new micromirror cell design according to the present invention is shown in FIG. 1. This micromirror cell is used in an array that often includes more than a thousand rows and columns of DMD elements. FIG. 1 is an exploded view of the DMD element showing the relationships between the DMD structures.

A DMD is fabricated on a semiconductor, typically silicon, substrate 104. Electrical control circuitry is typically fabricated in or on the surface of the semiconductor substrate 104 using standard integrated circuit process flows. This circuitry typically includes, but is not limited to, a memory cell associated with, and typically underlying, each mirror 102, and digital logic circuitry to control the transfer of the digital image data to the underlying memory cells. Voltage driver circuits to drive bias and reset signals to the mirror superstructure may also be fabricated on the DMD substrate, or may be external to the DMD. Image processing and data formatting logic is also formed in the substrate 104 of some designs. For the purposes of this disclosure, addressing circuitry is considered to include any circuitry, including direct voltage connections and shared memory cells, used to control the direction of rotation of a DMD mirror.

Some DMD configurations use a split reset configuration which allows several DMD elements to share one memory cell. Split reset reduces the number of memory cells necessary to operate a very large array, and makes more room available for voltage driver and image processing circuitry on the DMD integrated circuit. Split reset is enabled by the bistable operation of a DMD, which allows the contents of the underlying memory to change without effecting the position of the mirror 102 when the mirror has a bias voltage applied.

The silicon substrate 104 and any necessary metal interconnection layers are isolated from the DMD superstructure by an insulating layer 106 which is typically a deposited silicon dioxide layer on which the DMD superstructure is formed. Holes, or vias, are opened in the oxide layer to allow electrical connection of the DMD superstructure with the electronic circuitry formed in the substrate 104.

The first layer of the improved spring-ring DMD superstructure is a metalization layer, typically the third metalization layer and therefore often called M3. The first two metalization layers are typically required to interconnect the circuitry fabricated on the substrate. The third metalization layer is deposited on the insulating layer and patterned to form a mirror bias/reset connection 112 and connections 132 between the addressing circuitry and the address electrodes 110.

Mirror bias/reset voltages travel to each mirror 102 through a combination of paths using both the mirror bias/reset metalization 112 and the mirrors and torsion beams of adjacent mirror elements. Split reset and block reset designs require the array of mirrors to be subdivided into multiple subarrays each having an independent mirror bias connection. The landing electrode/mirror bias 112 configuration shown in FIG. 1 is ideally suited to applications that reset each row individually since the DMD elements are easily segregated into electrically isolated rows or columns simply by isolating the mirror bias/reset layer between the subarrays.

A first layer of supports, typically called spacervias, is fabricated on the metal layer forming the mirror bias/reset metalization 112 and the address electrode pads 132. These spacervias, which include both hinge support spacervias 116 and upper address electrode spacervias 118, are typically formed by spinning a thin spacer layer over the address electrodes 110 and mirror bias connections 112. This thin spacer layer is typically a 1 $\mu$m thick layer of positive photoresist. After the photoresist layer is deposited, it is exposed, patterned, and deep UV hardened to form holes in which the spacervias will be formed. This spacer layer and a thicker spacer layer used later in the fabrication process are often called sacrificial layers since they are used only as forms during the fabrication process and are removed prior to device operation.

A thin layer of metal is sputtered onto the spacer layer and into the holes. An oxide is then deposited over the thin metal layer and patterned to form an etch mask over the regions that later will form hinges 120 and raised portions of the address electrode 122. A thicker layer of metal, typically an aluminum alloy, is sputtered over the thin layer and oxide etch masks. Another layer of oxide is deposited and patterned to define the hinge yoke 114 and the spring-ring 124. After this second oxide layer is patterned, the two metals layers are etched simultaneously and the oxide etch stops over the hinges 120 are removed to leave a thick rigid hinge yoke 114, spring-ring 124, and the address electrodes 110 formed by both metal layers, as well as thin flexible torsion beams 124 formed by only the thin layer of torsion beam metal.

A thick spacer layer is then deposited over the spring-ring 124, address electrode 110, torsion beam hinge 120 and yoke 114. The thick spacer is then patterned to define holes in which mirror support spacervias 126 will be formed. The thick spacer layer is typically a 2 $\mu$m thick layer of positive photoresist. A layer of mirror metal, typically an aluminum alloy, is sputtered on the surface of the thick spacer layer and into the holes in the thick spacer layer. This metal layer is then patterned to form the mirrors 102. After the mirrors 102 are formed, both spacer layers are removed using a plasma etch.

Once the two spacer layers have been removed, the mirror is free to rotate about the axis formed by the torsion beam hinge 120. Electrostatic attraction between an address electrode 110 and the mirror 102, which in effect form the two plates of an air gap capacitor, is used to rotate the mirror 102.

The force created by the voltage potential is a function of the reciprocal of the distance between the two plates. As the rigid member rotates due to the electrostatic torque, the torsion beam hinges 120 deform and resist the rotation with a restoring torque which is an approximately linear function of the angular deflection of the torsion beams 120. The structure rotates until mechanically blocked by contact between the rotating mirror 102 and the spring-ring 124.

The spring-ring 124 stores energy when it is deflected by the mirror 102 and releases the stored energy as the mirror 102 is returned toward the undeflected state. When the electrostatic force deflecting the mirror 102 is removed, the stored potential energy snaps the spring-ring 124 back to the undeflected state, forcing the mirror 102 back toward its neutral position. The force of the spring-ring 124 overcomes, or at least helps to overcome, stiction between the mirror 102 and the spring-ring 124—freeing the mirror 102 and allowing the torsion beam hinges 120 to return the mirror 102 to the neutral position. Coupled with a reset pulse, spring-rings 124 ensure a reliable reset of all mirrors 102 in an array, eliminating the visual artifacts caused by stuck or prematurely released pixels.

To create an image using the micromirror device, the light source is positioned at an angle equal to twice the angle of rotation so that mirrors rotated toward the light source reflect light in a direction normal to the surface of the micromirror device and into the aperture of a projection lens—creating a bright pixel on the image plane. Mirrors rotated away from the light source reflect light away from the projection lens—leaving the corresponding pixel dark. Intermediate brightness levels are created by pulse width modulation techniques in which the mirror is rapidly rotated on and off. The duty cycle of the mirror determines the quantity of light reaching the image plane. The human eye integrates the light pulses and the brain perceives a flicker-free intermediate brightness level.

Full-color images are generated either by using three micromirror devices to produce three single-color images, or by sequentially forming three single-color images using a single micromirror device illuminated by a beam of light passing through three color filters mounted on a rotating color wheel.

Figure 2:
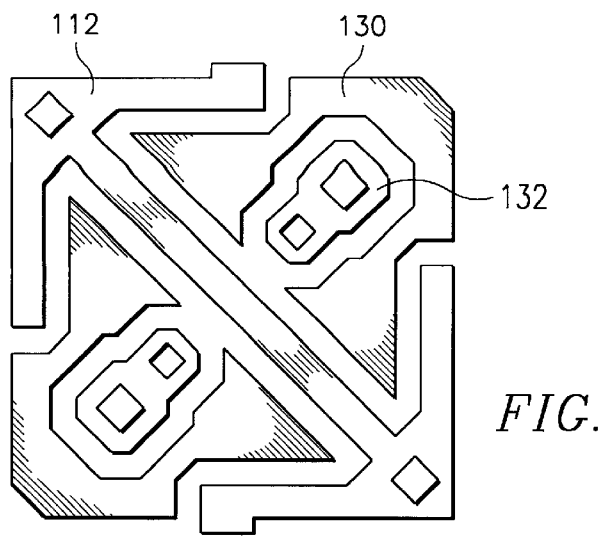
FIG. 2 is a plan view of the substrate or metal 3 layer of the micromechanical device of FIG. 1.

The improved spring-ring architecture disclosed herein provides several advantages. First, all of the electrostatically active surfaces are supported above the metal 3 layer, reducing the likelihood of short-circuits. Moving the electrostatically active components off of metal 3 frees up a large amount of metal 3. Dummy metal areas 130 are added to the metal 3 layer to provide a planar surface on which to deposit the first spacer layer, and to act as electrically inactive metal between the various components on metal 3. FIG. 2 is a plan view of the metal 3 or substrate layer showing the location of the mirror bias/reset metalization 112, the address electrode connections 132, and the dummy metal 130.

Another advantage of the disclosed architecture is the elimination of the need for an inverse-yoke structure. The inverse yoke of the prior spring-ring designs filled in the gap between the spring-ring and the active hinge yoke. The active hinge yoke has been eliminated and a raised address electrode 120 has replaced it. The raised address electrode 120 substantially fills the entire yoke and spring-ring layer. Since there are no longer large gaps on the intermediate level containing the spring-ring and the torsion hinges, an inverse yoke is unnecessary.

Furthermore, the architecture of FIG. 1 is easily scaled to other cell sizes with a minimal impact to the operational robustness of the cell. To shrink the cell, the dimensions are scaled and then the scaled cell is adjusted to meet the minimum design rules. Generally the gaps between the spring-ring and the address electrodes must be enlarged from their scaled-down dimensions to meet the design rules. Because the area of the address electrode on intermediate layer is maximized, the scaled micromirror cell retains as much of the operational robustness as possible.

Figure 3:
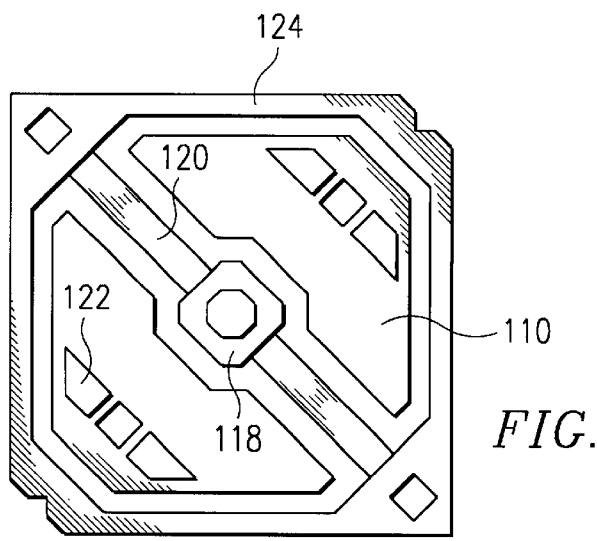
FIG. 3 is a plan view of the spring-ring and address electrode layer of the micromechanical device of FIG. 1.
Figure 4:
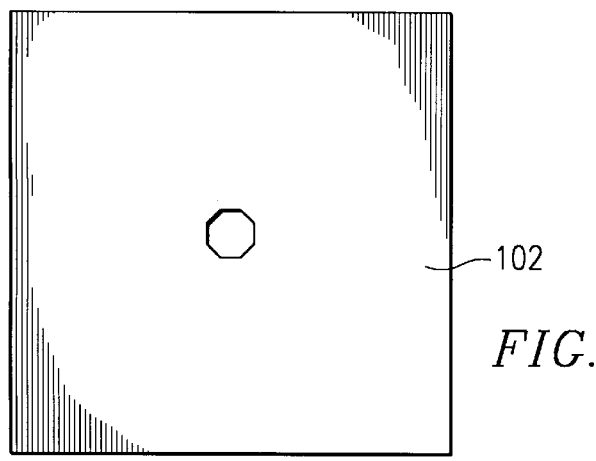
FIG. 4 is a plan view of the mirror layer of the micromechanical device of FIG. 1.

FIG. 3 is a plan view of the intermediate, or spring-ring level of the micromirror device showing the extent to which the intermediate level is filled. The spring-ring 124 and address electrodes 110 fill virtually all of the intermediate level. Also shown in FIG. 3 is the torsion beam hinge yoke 118 and torsion beam hinges 120. The raised portions 122 of the address electrode 110 are formed by patterning the hinge oxide etch stop in the desired shape and leaving the oxide between the thin hinge metal layer and the thicker address electrode metal layer. FIG. 4 is a plan view of the mirror layer.

The spring-based designs also prevent hinge creep, or hinge memory, which eventually impairs the operation of the device. Torsion beam hinge memory occurs when the metal forming the torsion beams develops a permanent twist after the mirror is repeatedly rotated in a given direction. The twist, often caused by movement along intercrystalline slip planes, biases the mirror toward one direction of rotation. If the electrostatic attraction between the address electrodes and the deflectable member is insufficient to overcome the bias created by torsion beam hinge memory, the mirror will always rotate in the direction of the torsion beam hinge memory when the mirror bias voltage is applied. Although torsion beam hinge memory rarely rises to the level at which the address electrodes cannot overcome the torsion beam hinge memory, torsion beam hinge memory reduces the address margin and causes intermittent errors. Intermittent mirror rotation errors are most often observed as a twinkling effect in darker regions of an image.

The spring-ring 124 not only functions to return the mirror 102 to the neutral, or undeflected position, it also assists the torsion beams 120 in resisting, and finally stopping, the electrostatic rotation of the rigid deflectable member. Since the torsion beams 120 no longer provide all of the resistive and restorative torque, the compliance of the torsion beams 120 is increased by making the torsion beams longer and narrower. A very desirable side effect of the increased compliance is the reduction in torsion beam hinge memory.

Torsion beam compliance is determined by the length, width, and thickness of the torsion beam hinges, and by the material forming the torsion beams. All of these parameters are limited by capabilities of the manufacturing process, or physical restraints on the size of the micromirror elements. Perhaps the best way to increase torsion beam compliance is to reduce the thickness of the torsion beams. Reducing the thickness of the torsion beams increases the compliance of the hinges. For example, a significant increase in torsion beam compliance is achieved by reducing the thickness of the torsion beams from 635 Å to 600 Å.

Figure 5:
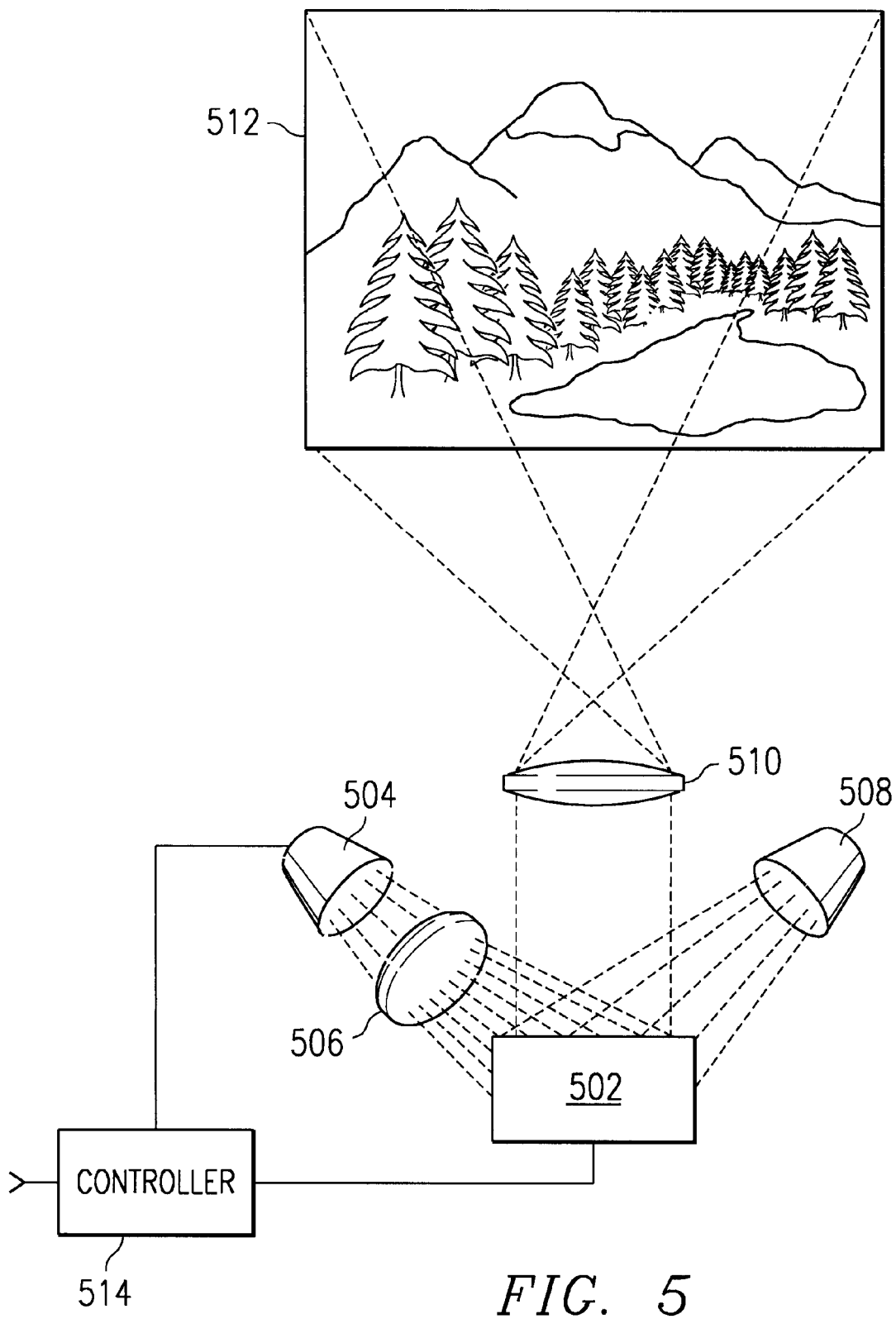
FIG. 5 is a schematic view of a micromirror-based projection system utilizing an improved micromirror device according to one embodiment of the present invention.

FIG. 5 is a schematic view of an image projection system 500 using an improved micromirror 502 according to the present invention. In FIG. 5, light from light source 504 is focused on the improved micromirror 502 by lens 506. Although shown as a single lens, lens 506 is typically a group of lenses and mirrors which together focus and direct light from the light source 504 onto the surface of the micromirror device 502. Image data and control signals from controller 514 cause some mirrors to rotate to an on position and others to rotate to an off position. Mirrors on the micromirror device that are rotated to an off position reflect light to a light trap 508 while mirrors rotated to an on position reflect light to projection lens 510, which is shown as a single lens for simplicity. Projection lens 510 focuses the light modulated by the micromirror device 502 onto an image plane or screen 512.

Thus, although there has been disclosed to this point a particular embodiment for micromechanical device having a spring-ring return structure with an elevated address electrode and method of fabricating the same, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. An improved micromechanical device comprising:

a substrate;

a spring-ring suspended over said substrate;

at least one address electrode supported over said substrate; and a deflectable member supported over said spring-ring and said address electrode by a torsion beam hinge, said deflectable member operable to rotate about said torsion beam hinge in response to a voltage differential between said deflectable member and said address electrode, said spring-ring operable to resist deflection of said deflectable member when deflection of said deflectable member creates contact between said deflectable member and said spring-ring.

2. The improved micromechanical device of claim 1, said deflectable member comprising a mirror.

3. A method of fabricating an improved micromechanical device, said method comprising the steps of:
- fabricating at least two support structure on a substrate;
- fabricating at least one spring-ring spaced apart from said substrate and supported by at least one of said at least two support structures;
- fabricating at least one address electrode spaced apart from said substrate and supported by at least one of said at least two support structures; and
- fabricating a deflectable member spaced apart from said substrate, said at least one spring-ring, and said at least one address electrode, and supported by at least one of said at least one support structures, said deflectable member operable to move into contact with said spring-ring and said spring-ring operable to resist further movement of said deflectable member.

4. The method of claim 3, said steps of fabricating at least one spring-ring and fabricating at least one address electrode performed simultaneously.

5. The method of claim 3, said steps of fabricating at least one spring-ring and fabricating at least one address electrode performed simultaneously, wherein said at least one spring-ring and said at least one address electrode are equally spaced away from said substrate.

6. The method of claim 3, said step of fabricating at least one spring-ring comprising the step of fabricating a metal strip suspended between at least two of said at least one support structures.

7. A display system comprising:
- a light source capable of providing a light beam along a light path;
- a micromirror device on said light path, said micromirror device comprised an array of micromirror elements, each said micromirror element comprised of:
  - a substrate;
  - a spring-ring supported by and spaced apart from said substrate;
  - an address electrode supported by and spaced apart from said substrate; and
  - a deflectable member supported by said substrate and spaced apart from said spring, said deflectable member comprising a mirror in said light path and operable to deflect toward said spring, said spring operable to resist said deflection of said deflectable member upon contact between said spring and said deflectable member;
- a controller electrically connected to said micromirror device, said controller providing electrical signals to said micromirror device to cause said micromirror device to selectively deflect said deflectable members thereby selectively reflecting light striking said deflectable members along a projection light path; and
- projection optics located in said projection light path, said projection optics operable to focus light reflected by said micromirror device onto an image plane.

* * * * *